Patented Nov. 21, 1944

2,363,222

UNITED STATES PATENT OFFICE 2,363,222

CATALYTIC ALKYLATION

Fred J. Beyerstedt, Plainfield, N. J., assignor to Standard Oil Development Company, a corporation of Delaware No Drawing. Application August 12, 1939, Serial No. 289,786

19 Claims. (Cl. 260—683.4)

The present invention relates to the production of normally liquid saturated hydrocarbons suitable for use as motor fuels by the alkylation of saturated hydrocarbons containing at least one tertiary carbon atom per molecule with olefins, and particularly, the invention relates to a novel catalyst for the alkylation of isoparaffins with mono-olefins.

It is known that isoparaffins, particularly the normally gaseous ones, may be condensed with olefins, in particular, the normally gaseous mono-olefins, in the presence of various catalysts. Catalysts which have heretofore been used are boron fluoride-water-metallic nickel, metal halides, such as aluminum chloride, iron chloride and the like, acid activated clays, the mineral acids, such as, for example, sulfuric acid used alone or in combination with various compounds of the fifth group of the periodic system, the aluminum halide-alkali metal halide double salt complexes, and various other similar catalysts.

It has been previously proposed (Ipatieff et al., J. A. C. S. 57, 1616-1621 (1935)), to employ a mixture of boron fluoride-water-powdered metallic nickel as an alkylation catalyst for the production of normally liquid saturated hydrocarbons. However, such a catalyst has been found to be expensive and it has been found that the present novel catalyst, hereinafter more fully described, accomplishes far superior results to those attained by the use of the metallic nickel-water-boron fluoride mixture. Not only are the yields greatly improved, but the character of the product, that is, as to its octane number, volatility characteristics, etc., is superior to that previously produced when employing various of the previously described catalysts.

It is an object of the present invention to alkylate isoparaffins with mono-olefins to produce saturated normally liquid hydrocarbons boiling within the gasoline range.

It is a further object of the present invention to carry out the alkylation reaction in the presence of a solution of boron trifluoride in acids of phosphorus, in particular, ortho-phosphoric acid.

Other objects will be apparent to those skilled in the art upon an understanding of the following disclosure.

To accomplish the objects of this invention, paraffinic hydrocarbons containing at least one tertiary carbon atom per molecule are contacted with mono-olefins under alkylating conditions in the presence of the novel alkylation catalyst. It has been found that markedly increased yields of alkylation products having the desired motor fuel boiling range are produced when a solution of boron trifluoride in an acid of phosphorus is employed as an alkylation catalyst. The exact nature of the catalyst is not known, but it is believed that the boron fluoride forms a complex with the phosphorus acids to produce a definite chemical compound. In cases where the phosphorus acid employed contains as much as 15, 20, or even as high as 40% of water, the introduction of boron fluoride to said mixture presents further difficulties in the identity of the ultimate catalyst mixture for the reason that it is not known what the exact nature of this mixture is. "Modern Inorganic Chemistry" by J. W. Mellor, states that several compounds are formed when $BF_3$ is contacted with water. One reaction consists in the hydrolysis of part of the $BF_3$ which produces boric acid and HF. The HF produced reacts with unhydrolyzed $BF_3$ to give $HBF_4$. In addition, $BF_3$ is known to form hydrates with water. It is also quite likely that the $BF_3$ undergoes reaction with the phosphorus acids, thereby producing some stable compounds of boron trifluoride and phosphoric acid which likewise will be retained in the catalyst mixture. This is particularly true where the solution of the acids of phosphorus is completely saturated with boron fluoride under the reaction conditions. It is to be distinctly understood, however, that the process of the present invention is not limited to any theory of the reaction or of the composition of the catalyst employed and that the claims appended hereto are not to be limited in the light of the above discussed theory.

In effecting the process of the present invention, it is only necessary that the catalyst be prepared according to the following teachings.

In making up the catalyst composition for use according to the process of the invention, an 85% ortho-phosphoric acid of commercial grade which contains about 15% of water, or 60% ortho-phosphoric acid containing 40% water maintained at room temperature, has bubbled therein boron trifluoride until there is no further change in weight of the solution. Any excess boron fluoride, if desired, may be removed from this solution by bubbling some inert gas, such as nitrogen or $CO_2$ through the saturated solution.

Another catalyst composition which was prepared was made by introducing phosphorus pentoxide into a commercial grade of 85% ortho-phosphoric acid until the mixture was equivalent to 100% ortho-phosphoric acid. To this composition there was added sufficient boron trifluoride under the temperature and pressure conditions of the alklation reaction in which the catalyst was to be used, so that the 100% ortho-phosphoric acid was completely saturated with the boron trifluoride. As in the case of the catalyst prepared according to the process of the preceding paragraph, inert gas may be bubbled through this solution to remove any free boron trifluoride, although this treatment is optional.

The temperature for carrying out the alkylation reaction is maintained fairly low, that is, of the order of about 30° F. to about 100° F., preferably between about 40° F. and about 70° F., although temperatures outside of this range may be employed. The time of reaction may vary between about 5 minutes and about 2½ hours or longer, depending upon the other reaction conditions. It is ordinarily satisfactory to use reaction times of between about 10 and about 60 minutes.

It is advisable to carry out the reaction in the liquid phase and where the higher temperatures are employed, the use of super-atmospheric pressure is required to maintain a liquid phase reaction. It is contemplated, however, to carry out the reaction in either the liquid or the vapor phase. Where a refinery $C_4$ cut, either used alone or augmented by field butanes or extraneously produced olefins, is used as the feed stock, pressures of from about 0 to about 12 atmospheres and even as high as 100 atmospheres, depending upon the temperature employed, may be used.

It has been found desirable to maintain a substantial excess of the hydrocarbon containing at least one tertiary carbon atom per molecule in the reaction zone and to operate in a reaction medium containing an excess of the novel catalyst composition. Where isobutane or isopentane is employed as the chief isoparaffinic reactant, the molar excess may range from 1 to 10 or even 30 mols per mol of mono-olefins present. Equal molecular quantities of isoparaffins and mono-olefins are contemplated, although better yields of the desired product are obtained as above described.

Any suitable apparatus which has heretofore been employed for polymerization or alkylation processes may be employed for carrying out the process of the present invention. Thus, for example, plants used for the polymerization or alkylation of refinery $C_4$ cuts or field butanes and involving the use of concentrated sulfuric acid as the catalyst are quite suitable, with minor modifications well within the scope of those skilled in the art, for use in alkylation reactions involving the same types of feed stocks but employing the novel alkylation catalyst herein described.

As is the case of alkylating refinery $C_4$ cut with concentrated sulfuric acid, it is desirable, when employing phosphoric acid-boron trifluoride catalyst mixtures, to recycle to the alkylation zone the products of the reaction boiling above and/or below the boiling range of the desired fraction; thus, where a final product composed of $C_6$ through $C_9$ hydrocarbons is desired, any unreacted reactants, e. g., $C_4$ and/or $C_5$ hydrocarbons, lower boiling products of the reaction, that is, those products boiling below the $C_4$, and the higher boiling products boiling above the $C_9$ or $C_{10}$ hydrocarbons, if the $C_9$ fraction is desired in the final product, may be separated from the desired product and returned either in whole or in part to the original alkylation zone in order to materially increase the yields of the desired products based upon the fresh mono-olefins and fresh isoparaffins added to the alkylation unit.

Although it is preferred to use isobutane and mixtures containing isobutane as the paraffinic reactant in the process, it is to be distinctly understood that isopentane and similar higher homologues containing at least one tertiary carbon atom per molecule may be employed. In fact, these higher homologues are quite desirable as reactants where it is desired to produce safety fuels, aviation naphthas, and the like. In addition, the phosphoric acid-boron trifluoride alkylation catalyst may be employed in the alkylation of cracked naphthas coming from either catalytic or thermal cracking units in order to alkylate the isoparaffins and olefins contained therein. Such a procedure is highly desirable, since it effects a condensation or alkylation of these lower isoparaffinic and mono-olefinic constituents without the necessity for effecting a separation of them from the cracked naphthas and at the same time materially increases the octane number, volatility characteristics, etc. of those naphthas. In many cases a naphtha prepared by such treatment finds direct usage after the desired fractionation as aviation gasoline or safety fuel.

As the olefinic reactants, ethylene, propylene, normal butylenes, isobutylene, trimethyl ethylene, the isomeric pentenes, and similar higher mono-olefinic hydrocarbons of either a straight chain or branched chain structure, as well as the corresponding normally liquid polymers, inter-polymers and cross-polymers, such as di-isobutylene, tri-isobutylene, the co-dimers of normal butylene and isobutylene, and the like, may be employed. It is only essential for a successful operation of the present invention to have a feed stock containing at least one paraffinic hydrocarbon containing at least one tertiary carbon atom per molecule and at least one olefin. Mixtures of two or more of the olefins and paraffins above described are particularly suitable for use as feed stocks for alkylation in the presence of the novel catalyst. Thus, $C_3$, $C_4$ and/or $C_5$ cuts from thermal and catalytic cracking units, field butanes that have been subjected to prior isomerization and partial dehydrogenation treatments, refinery stabilizer bottoms, spent gases, and liquid products from catalytic polymerization and copolymerization processes are all excellent feed stocks for the process of the present invention. Any one of these feed stocks, while being suitable of itself, may be augmented by extraneous source of either isoparaffins or mono-olefins to give a feed stock of the desired initial composition.

The process may be carried out either as a batch or continuous type of operation, although it is preferred, from an economic standpoint, to carry out the same continuously. Likewise, it has been found in the present process, as in previous alkylation processes, that the more intimate the contact between the feed stock and the catalyst, the better the yield of saturated product obtained. In the case of batch operations, mechanical stirrers or agitators are adequate. In continuous operations, turbo mixers, jets of restricted internal diameter, porous thimbles and the like provide ample agitation and means for intermingling of the reaction mass with the catalyst. In a continuous process, in order to maintain the catalyst strength over long periods of time, boron trifluoride may be admixed in small amounts with the feed stock, thereby maintaining a substantially completely saturated catalyst mixture throughout the life of the catalyst in the alkylation chamber, or the boron fluoride may be added in small amounts directly to the catalyst solution in the reactor to accomplish the same ends. As previously stated, it is advisable in some instances, in order to secure excellent yields and rapid reaction rates, to carry the alkylation out under super-atmospheric pressures at least sufficient to maintain the reaction in the liquid phase. In addition, this procedure is advantageous in that, upon the introduction either continuously or intermittently of small amounts of boron trifluoride into the reaction zone, either indirectly through the feed stock or directly to the catalyst in the reaction zone, substantially larger amounts of boron trifluoride may be retained in the liquid reaction mixture, thereby insuring the maintenance of the catalyst concentration throughout the alkylation reaction.

The following examples are intended to be illustrative of the invention disclosed therein and are not to be considered in any way as limiting the scope of the appended claims.

Example 1

Boron trifluoride was bubbled into an 85% syrupy phosphoric acid of commercial grade at 70° F. and at atmospheric pressure until no further change in weight of the solution occurred. 741 grams of this catalyst mixture had added thereto 360 grams of isopentane. During vigorous agitation 94 grams of di-isobutylene were slowly added over a period of 40 minutes. The reaction mixture was stirred for an additional 80 minutes at 70° F. and at atmospheric pressure. The paraffin to olefin ratio amounted to 3:1, the olefin being calculated as monomer. The weight of the $C_6$ and heavier hydrocarbon produced amounted to 237% based upon the total olefin in the reaction mixture. The $C_6$–$C_9$ cut, boiling 105–300°, amounted to 69.7% of the total $C_6$ and heavier product. The bromine number of this fraction was 0 and the bromine number of the fraction boiling above the $C_6$ to $C_9$ fraction was about 15. The product, therefore, boiling within the gasoline range (105°–300° F.) was substantially completely composed of paraffins.

Example 2

85% syrupy phosphoric acid of commercial grade had added thereto sufficient phosphorus pentoxide to substantially completely saturate the same and produce the equivalent of about 100% ortho-phosphoric acid. Boron trifluoride was added to this acid at 70° F. and atmospheric pressure until no further change in weight of the solution occurred. For a period of 4 hours carbon dioxide was bubbled through 300 grams of this catalyst solution with no change in weight. 360 grams of isopentane were added to 745 grams of this catalyst mixture and during vigorous agitation 94 grams of di-isobutylene were added slowly over a period of 40 minutes. Stirring was continued for an additional 80 minutes. A yield of 278% of $C_6$ and heavier hydrocarbons based upon the total olefin in the reaction mixture was obtained. The $C_6$ through $C_9$ fraction, which was fractionated from this product, constituted 77% of the total isopentane-free product. The bromine number of this fraction was about 2.3 and of the residue boiling above 300° F., which corresponds to the $C_{10}$ and heavier fraction, about 3.8.

Under comparable conditions, sulfuric acid gave a yield of about 245%.

Example 3

Using the same type of catalyst mixture of boron trifluoride-100% phosphoric acid mixture as an alkylation catalyst under substantially the same conditions of operation and using the same feed stock as in the preceding example except that the catalyst was present in 50 volume per cent in contrast to 55 volume per cent in Example 2 and the time of contact with stirring was reduced from a total of 120 minutes to 60 minutes, 40 minutes still being allowed for the olefin addition, a yield of 275% based upon the total olefin reacted was obtained, of which 70.5% constituted the $C_6$ to $C_9$ fraction having a boiling range of 105° F. to 300° F. This fraction had a bromine number of 0.8.

Example 4

In a similar run conducted according to the process outlined in Example 3, except that the volume per cent of catalyst was 20% instead of 50%, a yield of 216% based upon the total olefin reacted was attained, of which 67% constituted the $C_6$ to $C_9$ fraction having a boiling range of 105°–300° F. This fraction had a bromine number of 1.

Example 5

To the same catalyst composition as was used in Examples 2, 3 and 4, isobutane was mixed with di-isobutylene in the ratio of 3 mols to 1 mol, the olefin being calculated on the basis of monomer. The temperature of the reaction was maintained between about 12° F. and about 25° F. and the olefin was added to the isobutane-catalyst composition slowly over a period of 40 minutes with an additional 20 minutes allowed for completion of the reaction. During the olefin addition and the 20-minute period after the final olefin addition, the reaction mixture was vigorously agitated with a mechanical stirrer. The catalyst was present to the extent of 50 volume per cent. A $C_5$ to $C_8$ fraction having a boiling range between 57° F. and 265° F. was obtained, amounting to 68.5% of the total normally liquid product. It had a bromine number of 1.7. The total yield of normally liquid product based upon the olefins contained in the feed amounted to 188%.

Example 6

In a series of three one-hour batch runs carried out under substantially the same conditions, feed stock composition, etc., as in Example 3, but wherein the same catalyst composition used in the first run was used again in the second run without addition of fresh catalyst, and the catalyst used in the second run was used again in the third run without addition of fresh catalyst, yields of 275%, 306% and 272% were obtained with the $C_6$ to $C_9$ cut in the normally liquid product obtained boiling above the $C_6$ range, constituting 70.5%, 73.5% and 73%, respectively. At the end of this series of three one-hour runs, the catalyst had not absorbed any organic matter, had a good appearance, and so far as could be determined, the ultimate catalyst consumption was negligible. It is apparent from this series of runs that the catalyst is not appreciably degraded by reduction due to the hydrocarbons under the reaction conditions employed. Under comparable conditions, $H_2SO_4$ is more rapidly degraded.

Attempts to alkylate isoparaffins with mono-olefins in the presence of 85% and 100% phosphoric acid alone have been unsuccessful under comparable reaction conditions. Using the same reactant ratio and reactants as in the preceding examples, boron fluoride alone was employed as a catalyst. A yield of 109% of $C_6$ and heavier hydrocarbons based on the total olefin fed to the reaction zone was obtained while using an iso-pentane-di-isobutylene feed stock. Only 10% of the normally liquid product boiled within the C₆ through C₉ range. This fraction had a bromine number of about 12. The remainder of the product boiling above the C₆ to C₉ range had a bromine number of about 50. It is quite evident from these experiments that phosphoric acid when used alone and boron fluoride when used alone have negligible tendencies to promote alkylation reactions. However, it is quite apparent from the data presented in Examples 1 through 6 that the catalyst mixture or complex formed by mixing phosphoric acids with boron trifluoride is an efficient and highly desirable alkylation catalyst.

The nature and objects of the present invention having thus been described and illustrated, what is claimed as new and useful and is desired to be secured by Letters Patent is:

1. A process which comprises reacting a normally gaseous isoparaffin with mono-olefins at a temperature between about 30° F. and about 100° F. in the presence of a catalyst composition prepared by substantially saturating ortho phosphoric acid with boron trifluoride.

2. A process as in claim 1 wherein the reaction mixture is vigorously agitated during at least a substantial part of the reaction and wherein the olefin is a polymer of a normally gaseous monoolefin.

3. A process which comprises reacting isoparaffins with mono-olefins under alkylating conditions in the presence of a composition formed by introducing boron trifluoride into an aqueous phosphoric acid solution having a concentration between about 60 and about 100%.

4. A process as in claim 3 wherein the process is carried out in a continuous manner, wherein small amounts of boron trifluoride are continuously added and wherein the reaction is carried out under at least sufficient superatmospheric pressure to maintain the reactants and reaction mixture in the liquid phase under the conditions obtaining.

5. A process which comprises reacting isoparaffins with mono-olefins at a temperature between about 40° F. and about 70° F. while agitating the reactants for between about 10 and about 120 minutes in the presence of a catalyst composition prepared by bubbling boron trifluoride into an aqueous solution of a phosphoric acid of between about 85 and about 100% concentration until the solution is substantially completely saturated.

6. A process which comprises reacting isopentane and di-isobutylene for about 2 hours with agitation at a temperature of about 70° F. in the presence of a catalyst prepared by substantially completely saturating 100% ortho-phosphoric acid with boron trifluoride.

7. A process as in claim 6 wherein the catalyst is prepared by adding sufficient P₂O₅ to 85% H₃PO₄ to produce the equivalent of 100% H₃PO₄ and saturating the resulting combination with BF₃.

8. A process for the production of a normally liquid hydrocarbon mixture boiling within the gasoline boiling range, which comprises preparing a mixture of isopentane and a substantially completely saturated solution formed by bubbling boron trifluoride into aqueous ortho-phosphoric acid of a concentration between about 85% and about 100%, slowly adding to said mixture over a period of about 40 minutes with agitation enough di-isobutylene to amount to about a 3:1 mol ratio of isopentane to di-isobutylene calculated as mono-isobutylene, continuing the reaction for an additional 20 minutes approximately and with agitation maintaining the reaction mixture during the entire reaction at a temperature of about 70° F. and recovering from the final product a substantially saturated fraction boiling between about 105° F. and about 300° F.

9. A process as in claim 8 wherein 85% orthophosphoric acid has added thereto sufficient P₂O₅ to produce the equivalent of 100% orthophosphoric acid.

10. A process as in claim 8 wherein a fraction boiling above 300° F. and a fraction boiling below 105° F. are returned to the reaction zone substantially at the rate of their formation and separation.

11. A process as in claim 5 wherein the feed stock is a refinery C₄ cut comprising isobutane, normal butane, isobutylene and normal butylenes.

12. A process which comprises reacting under alkylation conditions at least one isoparaffin with at least one olefin in the presence of a catalyst composition prepared by introducing boron trifluoride into orthophosphoric acid.

13. A process which comprises reacting under alkylation conditions at least one isoparaffin with ethylene in the presence of a catalyst composition prepared by introducing boron trifluoride into orthophosphoric acid.

14. A process for the production of a normally liquid hydrocarbon mixture boiling within the gasoline boiling range which comprises reacting a normally gaseous isoparaffin with ethylene under alkylation reaction conditions and in contact with a substantially completely saturated solution of aqueous orthophosphoric acid of between about 85%, and 100% concentration saturated with boron trifluoride.

15. A process which comprises reacting a normally gaseous isoparaffin with ethylene at a temperature between about 40° F. and about 70° F. while agitating the reactants for between about 10 and about 120 minutes in the presence of a catalyst composition prepared by bubbling boron trifluoride into an aqueous phosphoric acid solution of between about 85% and about 100% concentration under at least sufficient superatmospheric pressure to maintain liquid phase operation, and recovering saturated, normally liquid paraffinic hydrocarbons from the reacted mixture.

16. A process of alkylating an isoparaffin with an olefin which comprises reacting said isoparaffin with said olefin under alkylating conditions of operation in the presence of a catalyst of alkylation strength prepared by adding boron fluoride to phosphoric acid.

17. A process in accordance with claim 16 wherein the catalyst of alkylation strength is prepared by adding boron fluoride to a water-containing phosphoric acid in considerable excess of that required for reaction with the water present in the acid.

18. A process which comprises alkylating at least one isoparaffin with at least one monoolefin under alkylating conditions of operation in the presence of a catalyst composition of alkylation strength prepared by contact between boron fluoride and phosphoric acid.

19. A process in accordance with claim 18 wherein the catalyst of alkylation strength is prepared by contact between boron fluoride and aqueous orthophosphoric acid, the boron fluoride being in excess of that required for reaction with the water present in the said acid.

FRED J. BEYERSTEDT.